United States Patent [19]

Rodgers et al.

[11] 4,405,761
[45] Sep. 20, 1983

[54] NON-EMISSIVE, FLAME-RETARDANT COATING COMPOSITIONS

[75] Inventors: Stephen D. Rodgers, Bowie, Md.; Richard J. Dick, Columbus; Vincent D. McGinniss, Delaware, both of Ohio

[73] Assignee: Battelle Development Corporation, Columbus, Ohio

[21] Appl. No.: 199,843

[22] Filed: Oct. 23, 1980

[51] Int. Cl.$^3$ .............................................. C08L 63/10
[52] U.S. Cl. .................... 525/404; 524/114; 524/288; 525/392; 525/445; 525/529; 525/530; 528/102; 260/404.8; 260/405.5; 560/83
[58] Field of Search ......... 260/18 EP, 18 PF, 18 PN, 260/29.2 EP; 525/404, 529, 530, 531, 532, 391, 392; 528/102

[56] References Cited

U.S. PATENT DOCUMENTS

| | | | |
|---|---|---|---|
| 2,940,986 | 6/1960 | Newey | 260/18 PF |
| 3,268,619 | 8/1966 | Nametz | 528/102 |
| 3,280,216 | 10/1966 | Partansky | 528/102 |
| 3,296,153 | 1/1967 | Snogren | 260/18 PN |
| 3,350,352 | 10/1967 | Smith | 528/102 |
| 3,425,975 | 2/1969 | Barrett | 260/18 EP |
| 3,527,720 | 9/1970 | Groff | 260/18 EP |
| 3,816,366 | 6/1974 | Laudise | 260/18 PN |
| 3,817,876 | 6/1974 | Fukutani | 525/404 |
| 3,900,437 | 8/1975 | Preston | 260/18 PN |
| 3,931,058 | 1/1976 | Batzer | 260/18 PN |
| 4,040,994 | 8/1977 | Lewis | 260/18 PF |
| 4,086,197 | 4/1978 | Bouche | 260/18 PN |
| 4,180,487 | 12/1979 | Floyd | 260/18 PN |

Primary Examiner—Paul R. Michl
Attorney, Agent, or Firm—Mueller and Smith

[57] ABSTRACT

Disclosed is a non-emissive, flame-retardant coating composition comprising a flame-retardant polymer; a solvent selected from water and/or a liquid, curable, non-flame promoting polyhalogenated solvent containing air-dryable functionality; and, optionally, a non-emissive, non-flame promoting surface-active agent selected from: a cationic, non-emissive, non-flame promoting, curable polyhalogenated compound containing an air-dryable group and a cationic surface-active group; an anionic, non-emissive, non-flame promoting, curable polyhalogenated compound containing an air-dryable group and an anionic surface-active group; and a nonionic, non-emissive, non-flame promoting polyhalogenated compound containing a nonionic surface-active group. Also disclosed is a method for reducing the emissivity of a polyamine/polyamide hardener for an epoxy resin wherein volatile, mobile, low molecular weight amine components in the hardener are reacted preferentially with a trapping agent selected from an epoxy compound and an alpha-, beta-ethylenically unsaturated carbonyl compound. Further disclosed is a method for reducing the tendency to crystallize and to retard dispersion in water of a highly halogenated polyepoxide resin by forming an adduct between at least a fraction of said halogenated polyepoxide resin and a long chain aliphatic compound.

18 Claims, No Drawings

NON-EMISSIVE, FLAME-RETARDANT COATING COMPOSITIONS

The present invention was developed during the course of work on Department of the Navy Contracts Nos. N00167-78-C-0083 and N00167-79-C-0222.

BACKGROUND OF THE INVENTION

The present invention relates to flame-retardant coating compositions and more particularly to such coatings which are non-emissive.

For present purposes, a non-emissive coating composition is a coating composition, an applied film of which does not evolve or emit any organic components thereof, including solvent, except for water during curing thereof. Non-emissive coatings are required, for example, for coating the interior of submarines when such submarines are at sea, because adequate ventilation to protect personnel aboard the submarine from volatile organic components cannot be effectively and adequately provided. Thus, the need for coating compositions which at most evolve water during the drying or curing of the coating composition after application. Further, such coatings should be flame-retardant in order to protect the substrate upon which the coating is applied as well as to retard the spread of fire. While non-emissive, flame-retardant coating compositions would appear on the surface to be easy to formulate, it must be remembered that such coatings cannot be formulated at the expense of desirable coatings characteristics such as, for example, flow, leveling, application viscosity, can stability, room temperature cure, and like desirable coatings characteristics. More on this can be found in the Dick et al report "Development of a Nonemissive General Purpose Paint for Submarine Interior Application," Final Report for Period 1 September 1978-31 August 1979; David W. Taylor Naval Ship Research and Development Center, Aug. 31, 1979, the disclosure of which is incorporated expressly herein by reference.

The coating compositions of the present invention meet such diverse performance requirements as outlined above and as will be more fully appreciated based on the disclosure contained herein.

BROAD STATEMENT OF THE INVENTION

The present invention relates to room temperature-curable, non-emissive, flame-retardant coating compositions. The main resin for the coating composition is a flame-retardant polymer selected from an air-dryable flame-retardant polymer, a room-temperature curable mixture of a flame-retardant polymer and curing agent therefor, and mixtures thereof. The solvent for the coating composition is selected from water, a liquid, curable, non-flame promoting solvent and mixtures thereof. The novel liquid, curable, non-flame promoting solvent comprises a liquid polyhalogenated organic ring compound substituted with an air-dryable group.

Since coating compositions may require surface-active agents or surfactants in order to emulsify some resins in water, the novel coating composition of the present invention optionally will contain a non-emissive, non-flame promoting, surface-active agent. Such surface-active agent is selected from a non-emissive, non-flame promoting non-ionic surface-active compound containing a surface-active nonionic group and a halogenated group; a curable, non-flame promoting, cationic surface-active compound containing a halogenated group and a curable group; and a curable, non-flame promoting, anionic surface-active compound containing a halogenated group and a curable group. The novel coating composition of the present invention contains at least one of the non-emissive, non-flame promoting surface-active agents or the curable, non-flame promoting solvent delineated above.

Another aspect of the present invention is an improved method for making a coating composition essentially non-emissive, wherein the coating composition comprises an polyepoxide resin and a resinous polyamine or polyamide hardener therefor. The hardener contains lower molecular weight emissive amine components. Such improvement comprises mixing a trapping agent with the hardener to react preferentially with said emissive amine components thereof for forming a non-emissive adduct. Such non-emissive adduct optionally may be protonated with a proton-donating acid to make an intrinsic, non-emissive, cationic surface-active agent. The trapping agent is an epoxy or an alpha-,beta-ethylenically unsaturated carbonyl compound.

A further aspect of the present invention is a method for retarding (super) halogenated flame-retardant resins (e.g. epoxide resins) from crystallizing from solution and for improving their dispersibility in water. This method comprises reacting at least a fraction of the halogenated resin with a long chain aliphatic group (e.g. a higher fatty acid). Unexpectedly, the resulting reaction product renders the blend of resin and reaction product retardant to crystallizing from solution and stably dispersible in water.

Advantages of the present invention include coating compositions which are totally non-emissive of organic components. Any organic solvent, cosolvent, or surfactants in the coating composition are non-flame promoting and are curable. This means that the advantages of retaining good coatings' properties while adhering to non-emissive and flame-retardant specifications can be met. Another advantage is that the coatings desirably are aqueous for ease of application and cleanup or are true 100% solids coatings. These and other advantages will be readily apparent to those skilled in the art based upon the disclosure herein contained.

DETAILED DESCRIPTION OF THE INVENTION

The present invention grew out of the development of non-emissive coatings primarily intended for the interior of submarines where volatilization of organic components from the coatings cannot be tolerated while the submarine is at sea due to the limited closed environment therein. It should be recognized, however, that the flame-retardant, non-emissive coatings of the present invention have a far wider applicability in that the coatings are not only flame-retardant but also are non-emissive for reduction of organic volatiles from the room temperature curing film which provides greater environmental safety to those people applying the paint and to those people in the vicinity of the drying paint films. The room temperature-curable, non-emissive, flame-retardant coating composition of the present invention is unique in that conventional coatings' properties are retained while other desirable attributes of non-emissivity and flame-retardancy are provided. Moreover, the coating composition of the present invention has the flexibility, depending upon its intended formulation and ultimate end use, to contain cosolvents and/or surfactants which are non-emissive and non-flame promoting. Such solvents and surfactants increase the effective non-volatile solids content of the coating composition as well as replace conventional solvents and surfactants which often are volatile or emissive during room temperature curing of the applied film of the coating composition of the present invention and often are flammable. Moreover, the coating composition of the present invention additionally has the flexibility of being able to be formulated as an essentially 100% non-volatile solids coating composition wherein the liquid, curable, non-flame promoting solvent is used in such coating composition.

Referring now to the novel solvents of the present invention, such solvents are liquid by definition. This means that the solvents are liquid under application conditions and storage conditions of the coating composition which typically comprehends temperatures often ranging from as low as about 10° C. on up to about even 50° C. on occasion, though normally such temperatures for application and curing of the coating composition range from about 20° C. to about 30° C. (room temperature). The novel solvents of the present invention are curable and non-flame promoting. By non-flame promoting is meant that the solvents will not promote the spread of fire nor will they support a fire. Such recalcitrance to the propogation of fire may be termed fire-retardancy under some definitions, though no such requirement should be placed as a limitation on the solvents of the present invention. That the solvents do not promote fire is sufficient for present purposes, though it is admitted that some novel solvents may be flame-retardant also. Non-flame promotability of the solvents is achieved through polyhalogenation, and desirably, such polyhalogenation is provided by a halogenated ring group. Suitable halogenated groups include aromatic rings, carbocyclic rings including polycyclic and fused rings, and even heterocyclic rings on occasion. Preferably, the non-flame promotability of the solvents is derived from a polyhalogenated aromatic group or a polyhalogenated norbornene group.

Another feature unique to the novel solvents of the present invention is their non-emissiveness which is due to their curability. Curability of the novel solvents is achieved by providing functionality or a group which will air-dry to achieve such curing. Suitable groups which provide air-dry curing capability of the solvents of the present invention include, for example, an oxirane-functional group (for linking with an amine, for example), an allyl ether group, or an air-dryable group derived from a fatty acid. Of course, other functionalities can be relied upon for achieving air-dry capability of the solvents of the present invention as will be appreciated by those skilled in the art.

Accordingly, the liquid, curable, non-flame promoting solvents of the present invention can be represented by the following structure:

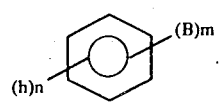

where:
h is halogen,
B is an air-dryable group, n is at least 2, and
m is at least 1.

Advantageously, h is chlorine or bromine, B is an air-dryable group as noted above, n is 4 or 5, and m is 1 or 2. Note that the polyhalogenated aromatic ring may be substituted by another group which may or may not contain air-dryable functionality.

Preferred solvents of the present invention include those solvents represented by the following general structures:

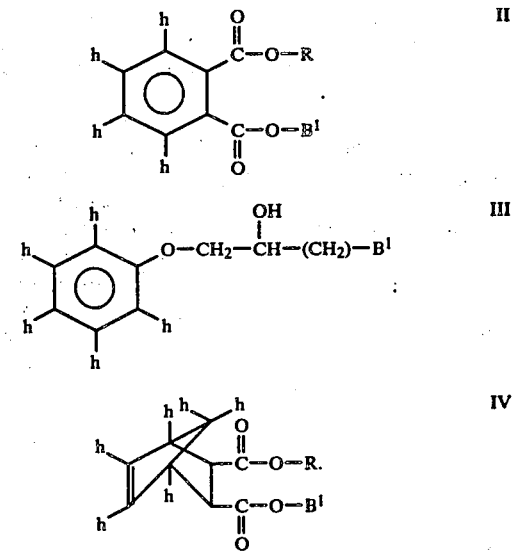

In the foregoing structures, R is an organic group which may contain air-dryable functionality as noted above. Typically, R is selected from an alkyl group, an allyl group, a haloalkyl group, an acrylic group, an alicyclic group, and an aromatic group. $B^1$ is an air-dryable group.

Representative polyhalogenated cyclic compounds which can be used in formulating the solvents of the present invention include, for example tetrachlorophthalic anhydride (TCPA), pentachlorophenol (PCP), pentabromophenol (PBP), 1,4,5,6,7,7-hexachloro-5-norbornene-2,3-dicarboxylic anhydride (HCNDA) and the like. Typical reaction schemes for synthesis of the novel solvents of the present invention utilizing the preferred polyhalogenated cyclic groups can be as follows. TCPA may be reacted with any alcohol to cause the anhydride ring to open for forming a TCPA-half-ester. The alcohol used in this reaction can be an alkyl alcohol, an allyl alcohol, a haloalkyl alcohol, an acrylic alcohol, or any other alcohol as is necessary, desirable, or convenient. Examples of such alcohols include, for example, methanol, ethanol, and higher straight chain or branched aliphatic, mono-alcohols; 2, 2, 2-trichloroethanol; 2, 3-propenol; hydroxyethyl acrylate, hydroxyethyl methacrylate, and related monool esters of acrylic and methacrylic acids; fatty acid hydroxy esters such as the reaction product of an unsaturated fatty acid with an epoxy; and the like.

The TCPA-half ester than can be reacted with a glycidyl allyl ether to form the desired solvent of the present invention. It should be noted that HCNDA may be used in place of TCPA in the foregoing synthesis scheme.

For forming solvents from PCP or PBP, the PCP and PBP are derivatized for further reaction as follows. The PCP or PBP can be reacted with epichlorohydrin or other halohydrin in the presence of a base for forming a glycidyl ether of PCP of PBP. This glycidyl ether than can be further reacted with an air-dryable fatty acid to provide air drying capability to the solvents. Representative air-dryable fatty acids include linoleic acid, linolenic acid, and the like. It will be appreciated that the foregoing synthesis schemes are merely illustrative and that other reaction schemes may be contemplated for forming the solvents of the present invention as those skilled in the art will appreciate. The examples will further amplify the preferred reaction schemes for forming the novel solvents of the present invention.

Referring now to the non-emissive, non-flame promoting, non-ionic surface-active compounds containing a halogenated cyclic group, such non-ionic surfactants optionally may be contained in the coating composition of the present invention for improving physical characteristics of the coating composition for application and/or to assist in stabilizing the flame-retardant polymer of the coating composition. While such non-ionic surfactants may be made curable in the coating composition, they need only be made non-emissive in order to comply with the precepts of the present invention. Non-flame promotability of the non-ionic surfactants is the same as defined above for the novel solvents. Their synthesis typically comprehends the reaction of a polyhalogenated cyclic compound (such as those described above) with a conventional non-ionic surface-active compound. Of course, the ultimate molecular weight of the surface-active compound should be such that it is non-volative or non-emissive under room temperature curing conditions of the coating composition. Typical conventional non-ionic surface-active compounds which may be used in forming the non-emissive, non-flame promoting, non-ionic surface-active agent of the present invention include, for example, polyoxyalkylene compounds including polyoxyalkylene alcohols and polyoxyalkylene glycols. Of course, other conventional non-ionic surface-active agents may be used as is necessary, desirable, or convenient in conventional fashion.

Typical synthesis schemes for forming the non-emissive, non-flame promoting non-ionic surfactant of the present invention include reacting a polyhalogenated phenol with an alkylene oxide in the presence of a boron trifluoride-etherate or similar catalyst. Alternatively, TCPA can be reacted with a monoalcohol containing an air-drying or reactive hydroxyl group followed by the reaction of this half-ester of TCPA with an alkylene oxide for forming the non-ionic surfactant. Other conventional reaction schemes can be envisioned for forming the non-ionic surfactants of the present invention as will be readily apparent to those skilled in the art.

Referring now to the novel non-emissive, non-flame-promoting cationic surfactants of the present invention, such cationic surfactants contain a cationic group, a source of flame-retardancy such as a polyhalogenated group, and a group which is air-drying or reactive under room temperature curing conditions for linking such cationic surfactant into the cured film of the coating composition. Preferred polyhalogenation is provided from polyhalogenated rings such as those described above. Amines and thiols are preferred for providing the cationic functionality to the surfactants, though other onium groups (e.g. phosphonium groups) broadly may have utility in the invention. The novel cationic surfactants of the present invention can be represented conventionally by the following structure:

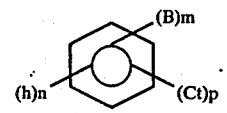   V where:
h is halogen,
B is an air-dryable group,
Ct is a cationic group,
n is at least 2,
m is at least 1, and
p is at least 1.

In the foregoing structure, h preferably is chlorine or bromine, B is an air-dryable group as described above, and Ct is a cationic group which preferably is a cationized amine or thiol. Also, n preferably is 4, and m and p are 1.

A preferred cationic surfactant of the present invention can be represented by the following structure:

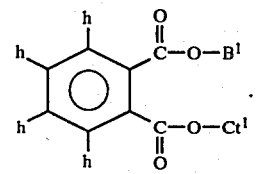   VI where: $Ct^1$ is a cationic-containing group and $B^1$ is an air-dryable group.

Synthesis schemes for forming the cationic surfactants as shown above include the reaction of an amine with a monofunctional epoxy or multifunctional epoxy wherein desirably the epoxy contains a polyhalogenated group for providing a degree of flame-retardancy or non-flame-promoting capability to the ultimate surfactant reaction product. Alternatively, an amine or thiol can be reacted with an alpha-, beta-ethylenically unsaturated carbonyl group by a conventional Michael addition for forming the cationic surfactant. The preferred ethylenically unsaturated carbonyl compound will be a bis-maleimide, an acrylate, or an acrylamide as those skilled in this art will appreciate. The thus-formed reaction product then can be neutralized with a proton-donating or protic acid for converting the amine group into a corresponding ammonium group for providing the cationic functionality required of the cationic surfactant. A thiol will be converted into a sulfonium group most readily with acid and halogen or with an alkyl halide (e.g. methyl iodide). Typical protic acids for this purpose include, for example, acetic acid, lactic acid, hydrochloric acid, formic acid, and like conventional organic and inorganic proton-donating acids, especially those shown in the cathodic electrocoating art.

It should be noted that relative to the novel cationic surfactants of the present invention, work on the present invention revealed a unique discovery relative to conventional flame-retardant epoxy resin coating compositions cured with a polyamine or polyamide hardener. Such coating compositions while curable at room temperature have certain organic components thereof which are emissive during the curing step. Initial analysis of this problem evolved the hypothesis that the polyamide hardener contained certain low molecular weight, mobile amine components which volatilize during the curing of the film of the composition at room temperature. Applying the technology generated for production of the novel cationic surfactants of the present invention led to efforts wherein specific compositionally-similar trapping agents were added to the polyamide hardener in order to attempt to trap such volatile mobile amine components. Results of such tests unexpectedly revealed that the trapping agents preferentially reacted with the low molecular weight, emissive amine components of the polyamide hardener to the exclusion of the desired high molecular weight polyamine and polyamide components of the hardener. Accordingly, suitable trapping agents include mono- and polyfunctional epoxides, optionally halogenated, alpha-,beta-ethylenically unsaturated carbonyl compounds (e.g. acrylates, acrylamides, and bis-maleimides) and similar activated double bond-containing compounds, and specific epoxy-adducts wherein air-drying functionality is reacted onto the epoxy trapping agent. The similarity of these trapping agents to those compounds useful in forming the novel cationic surfactants of the present invention should be readily apparent. The resulting reaction product in the polyamine hardener has been determined not to interfere with the curing reaction of the epoxy resin and polyamide hardener and such reaction product is non-emissive under curing conditions of the applied film. Such reaction products can be termed as an intrinsic or in-situ generated internal plasticizer in the composition, can be protonated with a proton-donating acid to form an intrinsic non-emissive surfactant in the composition, or can contain functionality for participating in the curing reaction to link into the film network of the coating composition. Under any of these conditions, the resulting reaction product or adduct of the trapping agent is non-emissive, can provide additional flame-retardancy to the coating composition, and even can favorably contribute to the non-volatile solids content of the coating composition by linking into the polymer network. The selectivity of the reaction of the trapping agent for the low molecular weight amine components is unexpected, but is amply demonstrated in examples which follow.

The novel non-emissive, non-flame-promoting anionic surfactants of the present invention can be synthesized by reaction schemes similar to those detailed above for the novel non-ionic and cationic surfactants. Such anionic surfactants can be represented generally by the following structure:

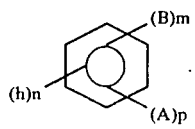   VII

A is an anionic group which preferably is a carboxyl anion. The other substituents are the same as they have been described above relative to the solvents, non-ionic surfactants, and cationic surfactants of the present invention. A preferred anionic surfactant can be represented as follows:

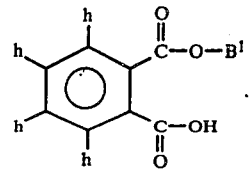   VIII where: $B^1$ is an air-dryable group.

Typical synthesis schemes for manufacturing such anionic surfactants include, for example, the reaction of TCPA with one mole of an alcohol containing air-drying or reactive functionality. Of course, HCNDA may be substituted for TCPA in such synthesis scheme. It will be appreciated that other anionic groups, such as sulfate or phosphate, can be utilized in forming the novel anionic surfactants of the present invention as can a variety of other reactants and reaction schemes.

Coating compositions formulated according to the present invention contain the novel surfactant or novel solvent of the present invention, and can contain both the novel solvent and one of the novel surfactants of the present invention if desired. Resins for forming the coating compositions of the present invention are curable at room temperature and include air-drying resins such as, for example, alkyd resins including modified (e.g. maleinized) alkyd resins. While such alkyd resins desirably are polyhalogenated for providing flame-retardancy, such is not necessary as the solvents of the surfactants of the present invention can be formulated to provide, at least to some degree, flame-retardancy to the coating composition. Desirably, though, the resins of the coating composition are conventional flame-retardant resins. Another desirable class of resins for the present invention are flame-retardant epoxy resins cured with an amine or amide hardener. In fact, combinations of alkyd resins and epoxy resins can be used according to the precepts of the present invention. Additionally, aqueous based systems of the coating composition can be combined with polyvinylidene chloride and similar latices.

Other components permissible in the coating composition include water as the solvent or water in combination with the novel cosolvent of the present invention. Not permitted in the coating composition are conventional volatile solvents, conventional volatile surfactants, and like conventional emissive volatile components normally found in coating compositions. Such emissive conventional solvents and surfactants are replaced by those non-emissive, non-flame-promoting solvents and surfactants of the present invention. Of course, pigments and fillers may be included in the coating composition in conventional fashion as such inert ingredients typically are not emissive.

Certain flame-retardant epoxy resins and alkyd resins, especially those highly brominated, have a tendency to crystallize readily out of solution and are difficult is emulsify into stable dispersions. Use of the novel solvents and surfactants of the present invention can assist in stably dispersing such resins for forming coating compositions which provide the requisite properties desired of coating compositions. Another approach to retarding the crystallization of such highly halogenated flame-retardant resins involves a technique for interrupting the crystallinity affinity of such resins. This interruption technique can be accomplished by reacting at least a fraction of the resin with a long chain hydrocarbyl compound such as a fatty acid. Desirably, such fatty acid is an air-drying fatty acid such as linoleic or linolenic acid for imposing additional curing ability into the system. Unexpectedly, it was discovered that by modifying such flame-retardant resins, the remainder of the unmodified resin could be readily emulsified in water to provide a stable dispersion or coating composition. Additionally, such stabilized resin blend could be used as part of a two-pack system with an amine hardener without the modified resin tending to crystallize upon storage thereof. The examples will fully support this embodiment of the invention also.

The following examples show how the present invention can be practiced but should not be construed as limiting. In this application, all percentages and proportions are by weight and all units are in the metric system, unless otherwise expressly indicated.

EXAMPLES

EXAMPLE 1

One mole (286 grams) of tetrachlorophthalic anhydride (TCPA) was mixed with one mole (58 grams) of allyl alcohol in a three-neck flask fitted with a heating jacket, reflux condenser and a stirrer. The mixture was heated up to 92° C. for two hours whereupon one mole (114 grams) of allyl glycidyl ether and 0.1% by weight benzyldimethyl amine catalyst were added to the flask. This addition caused an immediate exotherm to occur causing the temperature of the mixture to increase to 140° C.

The reaction mixture was allowed to cool to room temperature. The resulting product was a clear (100% solids) liquid containing no free acid functionality. The product solvent can be represented by the following general structure:

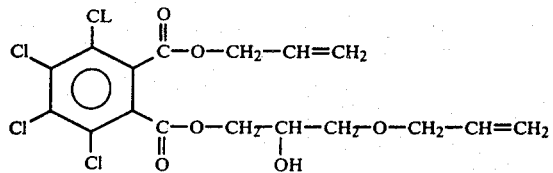

Note that the foregoing reaction scheme can be carried out in excess allyl alcohol as the reaction solvent followed by removal of excess allyl alcohol after the addition of the glycidyl allyl alcohol compound.

EXAMPLE 2

The procedure of Example 1 was repeated using hydroxyethyl methacrylate in place of the allyl alcohol as the ring-opening alcohol followed by the addition of the allyl glycidyl ether compound and 0.1% by weight benzoquinone as a polymerization inhibitor. The allyl glycidyl ether reaction was carried out to 90% completion followed by filtration of the unreacted TCPA crystals. The resulting, slightly-viscous liquid solvent had no detectable acid functionality and can be represented conventionally by the following general structure:

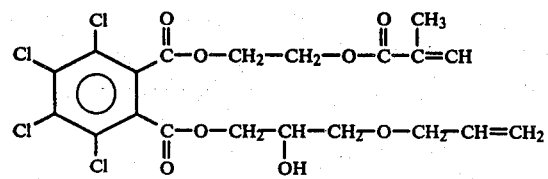

EXAMPLE 3

The procedure of Example 1 was repeated using trichloroethanol in place of allyl alcohol as the ring-opening alcohol. The resulting clear liquid can be represented conventionally by the following structure:

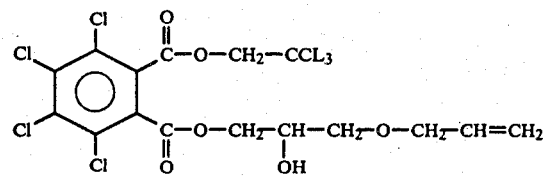

EXAMPLE 4

One mole of pentachlorophenol (PCP) was reacted at 40°-60° C. with an excess of epichlorohydrin and a sodium hydroxide/water dispersion to form the glycidyl ether of PCP. The ether then was reacted with one equivalent of linoleic acid at 80° C. to form a liquid, non-emissive, air-drying solvent of the following general structure:

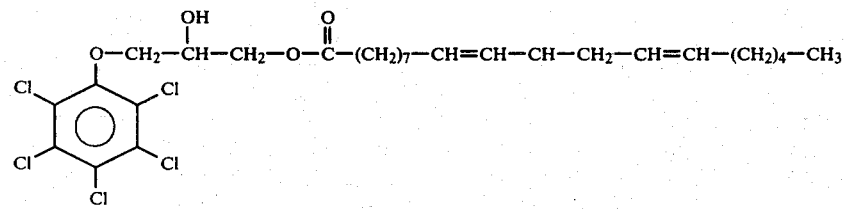

EXAMPLE 5

A control, non-flame-retardant, air-drying solvent was synthesized by reacting one mole of styrene oxide with one mole of linoleic acid in the presence of 0.1% amine catalyst. The control solvent has the following structure:

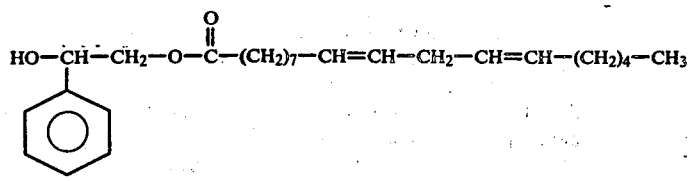

EXAMPLE 6

The air-drying solvents in Examples 1-5 were tested for their emissivity as follows: The solvents were blended with a 100% solids flame-retardant chlorinated alkyd resin [a chlorinated soya oil alkyd marketed as BECKOSOL 13-029 resin from Reichhold Chemical Company] at a 1:1 weight ratio. The blends were catalyzed with 0.02% cobalt, 0.015% zirconium, and 0.02% manganese octoate. The catalyzed blends were drawn down onto glass plates with a number 20 wire-wound rod and allowed to air-dry at room temperature for 5 days. The glass plates were weighed immediately after application of the coatings and after the 5-day drying period after which the applied films were tack-free, hard surface-cured films. Each of the solvents of Examples 1-5 had cured into the applied film of the air-drying alkyd as indicated by the weight loss measurements which showed that the films had lost between 0 and 2% of their weight after the 5-day room temperature curing period. Thus, all 5 coatings formulations were deemed to be non-emissive.

EXAMPLE 7

The coating compositions formulated in Example 6 next were tested for their flame-retardancy. The flame test utilized to determine flame-retardancy involved ¼" to ½" square dry film samples (removed from the glass upon which they were cured) which were placed within the gas flame of a Bunsen burner for approximately 1 second. Those film samples that immediately extinguished themselves upon removal from the open flame were designated as flame-retardant. Moreover, good flame-retardant systems were those which could withstand insertion and removal from the open flame several times without supporting or propogating combustion.

The comparative formulations of the air-drying alkyd with driers neat and the 1:1 weight blend of the alkyd and comparative solvent of Example 5 both burned rapidly in the flame and continued burning outside the flame. Thus, these formulations support combustion and are not flame-retardant. The novel compositions of alkyd and solvents of Examples 1-4 burned in the flame but immediately extinguished themselves upon removal from the flame, even upon repeated insertion and removal from the open flame. Thus, the novel compositions containing the novel solvents of Examples 1-4 definitely are flame-retardant.

EXAMPLE 8

One mole of TCPA was reacted with one mole of the reaction product of one mole of linoleic acid and one mole of propylene oxide to form a non-emissive, non-flame-promoting anionic surfactant having the following structure:

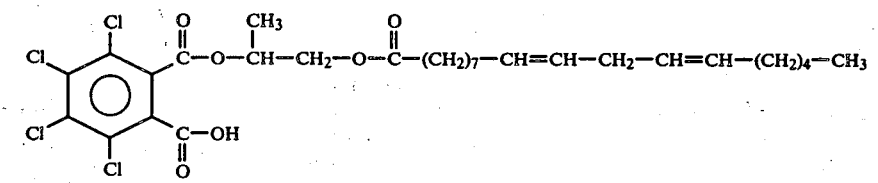

The reaction was conducted in tetrahydrofurnan (THF) solvent which was removed from the reaction product after its formation. Progress of the reaction was monitored by KOH titration techniques until one-half of the equivalent weight of the TCPA was determined to have been consumed.

EXAMPLE 9

A practical paint using the anionic surfactant of Example 8 can be made from the following ingredients.

TABLE I

| Ingredient | Paint A (Parts by weight) | Paint B (Parts by weight) |
| --- | --- | --- |
| Beckosol 13-029 resin | 66.70 | 82.00 |
| Demineralized Water | 140.00 | 25.00 |
| Cobalt Catalox | 0.10 | 0.13 |
| Zirconium Catalox | 0.07 | 0.09 |
| Manganese Octoate | 0.20 | 0.26 |
| Polywet AX-4 surfactant | 7.50 | 4.80 |
| Anionic Surfactant of Ex. 8 | 3.00 | 2.00 |
| | 217.57 | 114.28 |

Beckosol 13-029, a chlorinated alkyd of Reichhold Chemical Co., was stripped to 90% solids.
Cobalt Catalox, 12% active metal drier supplied by Ferro Chemical.
Zirconium Catalox, 12% active metal drier supplied by Ferro Chemical
Manganese Octoate, 6% active metal drier supplied by Shepard Chemical
Polywet AX-4, 40% active anionic surfactant supplied by Uniroyal In formulating both paints, the Beckosol alkyd resin was heated in a water bath to about 70° C. and positioned on a Premier mill. The water and anionic surfactant (neutralized to pH of 8 with NH$_4$OH), also heated to 160° F., then were slowly added to the heated alkyd resin under high shear agitation to form a stable emulsion. In Paint A, the Polywet wetting agent was added to the water before the resin emulsification step, while in Paint B, the wetting agent was added after the resin emulsification step.

Both paints demonstrated excellent stability and good dispersion characteristics. Both paints also demonstrated good application characteristics onto wood plaques and dried into continuous films having excellent hardness and flame retardant capability.

EXAMPLE 10

A non-emissive, non-flame-promoting nonionic surfactant was prepared by reacting the anionic surfactant of Example 8 (1 mole) with 4 moles of propylene oxide in the presence of BF$_3$-etherate cationic catalyst. The nonionic surfactant had the following structure:

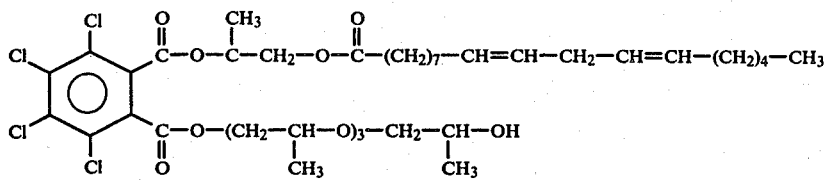

EXAMPLE 11

A curable, non-emissive, non-flame-promoting cationic surfactant was prepared by reacting 1 mole of DER 552 epoxy resin (Dow Epoxy Resin, 40%–50% bromine content, epoxide equivalent weight of 305–355, Dow Chemical Company, Midland, Mich.) with 1 mole of morpholine. The surfactant reaction product can be represented as follows:

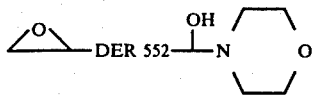

The surfactant can be neutralized with acid, e.g. acetic acid, to form the cationized form of the surfactant.

EXAMPLE 12

In order to evaluate the selective reaction of the various trapping agents with the low molecular weight mobile amine components of conventional polyamide hardeners, several trapping agents were reacted with VERSAMID 125 polyamide hardener (a liquid polyamide having an equivalent weight of 190 supplied by General Mills, Minneapolis, Minn.). The modified, non-emissive hardeners were formulated into coating compositions with flame-retardant epoxy resins, and applied films of the coating compositions tested in order to determine whether the modification to the hardener would interfere with the performance of the curing reaction. The following table displays the results obtained.

mid 125 hardener was subjected to liquid chromatography (LC) in order to generate an LC chromatogram thereof. The LC chromatogram revealed a major peak and a minor peak having a relative peak heighth ratio of 18:2. The minor peak is believed to be the emissive, low molecular weight components of the hardener. Monitoring of the minor peak and its ratio to the major peak upon reaction with the trapping agents should reveal the selectivity of the reaction.

The various modified hardeners of Example 12 were subjected to liquid chromatography and the LC chromatogram evaluated. For each of the trapping agents used, the relative peak heighths of the major peaks to the minor peaks increased to 14,400:4. Clearly, the selectivity of the trapping agent reaction is demonstrated.

We claim:

1. A room-temperature curable, non-emissive, flame-retardant coating composition which comprises:
   (A) a flame-retardant polymer selected from
      (1) an air-dryable flame-retardant polymer,
      (2) a room-temperature curable mixture of a flame-retardant polymer and curing agent therefor; and
      (3) mixtures thereof;
   (B) a solvent selected from
      (1) water,
      (2) a liquid, curable, non-emissive, non-flame promoting solvent comprising a polyhalogenated organic ring substituted with an air-dryable group; and
      (3) mixtures thereof; and
   (C) optionally, a non-emissive, non-flame promoting surface-active agent selected from
      (1) a cationic, non-emissive, non-flame promoting, curable polyhalogenated compound containing an air-dryable group and a cationic surface-active group;
      (2) an anionic, non-emissive, non-flame promoting, curable, polyhalogenated compound containing an air-dryable group and an anionic surface-active group; and

TABLE 2

| RUN NO. | EPOXY RESIN Type | Wt (gms) | HARDENER Type | Wt (gms) | TRAPPING AGENT Type | Wt (gms) | RESULTS |
|---|---|---|---|---|---|---|---|
| CONTROL | EPON 828 | 5 | V-125 | 5 | — | — | Full Cure in 3 days |
| 1 | EPON 828 | 5 | V-125 | 5 | Epichlorhydrin | 0.5 | Full Cure in 3 days |
| 2 | EPON 828 | 5 | V-125 | 5 | Epichlorhydrin | 0.5 | Full Cure in 3 days |
| 3 | EPON 828 | 5 | V-125 | 5 | Araldite 8047 | 0.5 | Full Cure in 3 days |
| 4 | EPON 828 | 5 | V-125 | 5 | Araldite 8047 | 1.0 | Full Cure in 3 days |
| 5 | EPON 828 | 5 | V-125 | 5 | Araldite 8047 Diethyl Amine | 1.0 1.0 | Full Cure in 3 days |

EPON 828 is a diglycidyl ether of bisphenol A, epoxide equivalent weight of 185–192, Shell Chemical Company.
V-125 is Versamid 125 liquid polyamide.
Araldite 8047 is a brominated epoxy resin, epoxy equivalent weight of 223–246, about 20% bromine content, Ciba-Geigy.

EXAMPLE 13

The modified Versamid 125 hardener of Example 12 was characterized further as to the selectivity of the trapping agents for preferentially reacting with the volatile amine components thereof. Initially, the Versa- (3) a nonionic, non-emissive, non-flame promoting polyhalogenated compound containing a nonionic surface-active group;

said coating composition containing at least said solvent (B)(2) or one of said surface-active agents (C)(1) or (C)(2).

2. The coating composition of claim 1 which contains said non-emissive solvent (B)(2) as the only solvent.

3. The coating composition of claim 1 which contains both water and said non-emissive solvent (B)(2).

4. The coating composition of claim 3 which also contains at least one of said surface-active agents (C)(1), (C)(2), or (C)(3).

5. The coating composition of claim 2 or 3 wherein said non-emissive solvent (B)(2) is represented by the following structure:

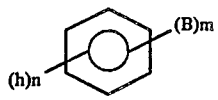

where:
h is halogen,
B is an air-dryable group,
n is at least 2, and
m is at least 1.

6. The coating composition of claim 5 wherein said solvent is represented by

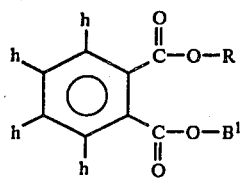

where:
R is an organic group,
h is chlorine or bromine, and
$B^1$ is an air-dryable organic group.

7. The coating composition of claim 6 wherein R is selected from $B^1$, an alkyl group, an allyl group, a haloalkyl group, an acrylic group, an alicyclic group, and an aromatic group; and $B^1$ is selected from the air-dryable groups of an oxirane group, an alkyl ether group, and a fatty-acid derived group.

8. The coating composition of claim 5 wherein said solvent is represented by the following general structure:

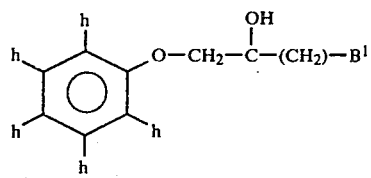

where:
h is chlorine or bromine, and
$B^1$ is an air-dryable group.

9. The coating composition of claim 8 wherein B is selected from the air-dryable groups of an allyl ether group, an oxirane group, and a fatty-acid-derived group.

10. The coating composition of claim 2 or 3 wherein said solvent is represented by the following structure:

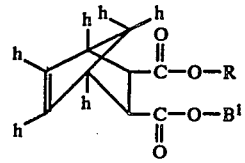

where:
h is chlorine or bromine,
$B^1$ is an air-dryable organic group, and
R is an organic group.

11. The coating composition of claim 1 which contains said cationic agent (C)(1) which is represented by the following structure:

where:
h is chlorine or bromine,
B is an air-dryable group,
Ct is a cationic group,
n is at least 2,
m and p each are at least 1.

12. The coating composition of claim 11 wherein said cationic agent (C)(1) is represented by the following structure:

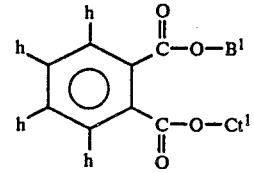

where:
$B^1$ is an air-dryable organic group, and
$Ct^1$ is a cationic-containing group.

13. The coating composition of claim 11 or 12 where B and $B^1$ are selected from an oxirane group, an air-dryable allyl ether group, and an air-dryable fatty acid-derived group; and Ct and $Ct^1$ are an ammonium or sulfonium group.

14. The coating composition of claim 1 which contains said anionic agent (C)(2) which is represented by the following structure:

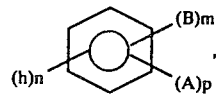

where:
h is chlorine or bromine,
B is an air-dryable group,
A is an anionic group
n is at least 2
m is at least 1, and
p is at least 1.

15. The coating composition of claim 14 wherein said anionic agent (C)(2) is represented by the following structure:

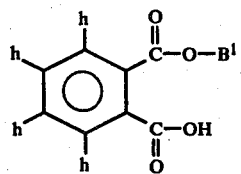

where:
B¹ is an air-dryable organic group.

16. The coating composition of claim 14 or 15 wherein A is an anionic carboxyl group, and B and B¹ are selected from the air-dryable groups of an oxirane group, an alkyl ether group, and a fatty acid-derived group.

17. The coating composition of claim 1 wherein said polymer (A)(1) is an air-dryable alkyd resin.

18. The coating composition of claim 1 wherein said polymer and curing agent (A)(2) are a polyepoxide resin and polyamine or polyamide hardener, respectively.

* * * * *